United States Patent [19]

Swinehart et al.

[11] 4,163,240

[45] Jul. 31, 1979

[54] SENSITIVE SILICON PIN DIODE FAST NEUTRON DOSIMETER

[75] Inventors: Philip R. Swinehart, Columbus; John M. Swartz, Westerville, both of Ohio

[73] Assignee: The Harshaw Chemical Company, Cleveland, Ohio

[21] Appl. No.: 779,346

[22] Filed: Mar. 21, 1977

[51] Int. Cl.² ............................................. H01L 27/14
[52] U.S. Cl. ........................................ 357/29; 357/30; 357/58; 357/52; 250/370; 250/390
[58] Field of Search ................. 357/29, 30, 58, 52; 250/390, 370

[56] References Cited

U.S. PATENT DOCUMENTS

| 3,225,198 | 12/1965 | Mayer | 250/83.3 |
|---|---|---|---|
| 3,396,318 | 8/1968 | Chow | 317/234 |
| 3,527,944 | 9/1970 | Kraner | 250/83 |
| 3,546,459 | 12/1970 | Higatsberger | 250/83.3 |
| 3,588,505 | 6/1971 | Johnson | 250/83.1 |
| 3,781,612 | 12/1973 | Llacer | 317/234 R |
| 3,928,866 | 12/1975 | Digoy | 357/30 |
| 3,982,267 | 9/1976 | Henry | 357/52 |

OTHER PUBLICATIONS

Swartz, et al., *Journal of Applied Physics*, vol. 37, No. 2, Feb. 1966.
Ammerlaan, *Journal of Applied Physics*, vol. 39, No. 13, Dec. 1968.

*Primary Examiner*—Martin H. Edlow
*Attorney, Agent, or Firm*—Alfred D. Lobo; James A. Lucas

[57] ABSTRACT

A method is disclosed of controlling and improving the sensitivity of silicon PIN diodes to dosage by fast neutrons. The method includes selecting a silicon mass of high resistivity n or p-type material having a relatively long minority carrier lifetime, in excess of 250 microseconds ($\mu$ sec) providing n+ and p+ -type junctions, and arranging the mass to obtain a silicon PIN diode dosimeter having a preselected ratio of edge area to volume. A silicon PIN diode personnel dosimeter sensitive to a radiation level of absorbed dose as low as 0.1 rad has been produced; this dosimeter, in the range from about 0.1 rad to about 10 rads has a sensitivity of at least 10 mV/rad.

8 Claims, 3 Drawing Figures

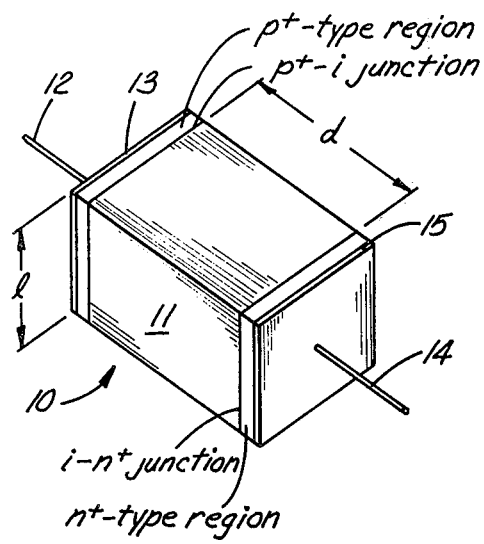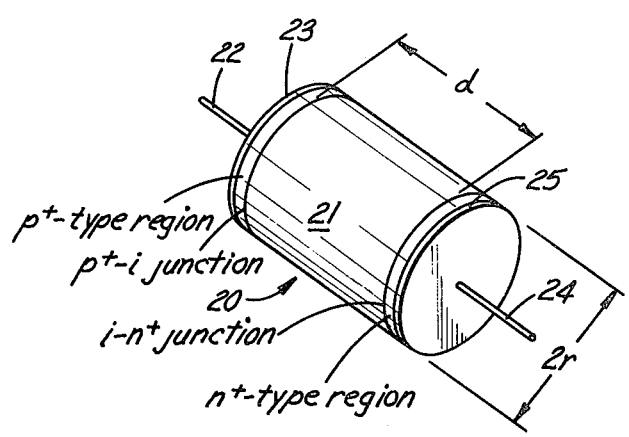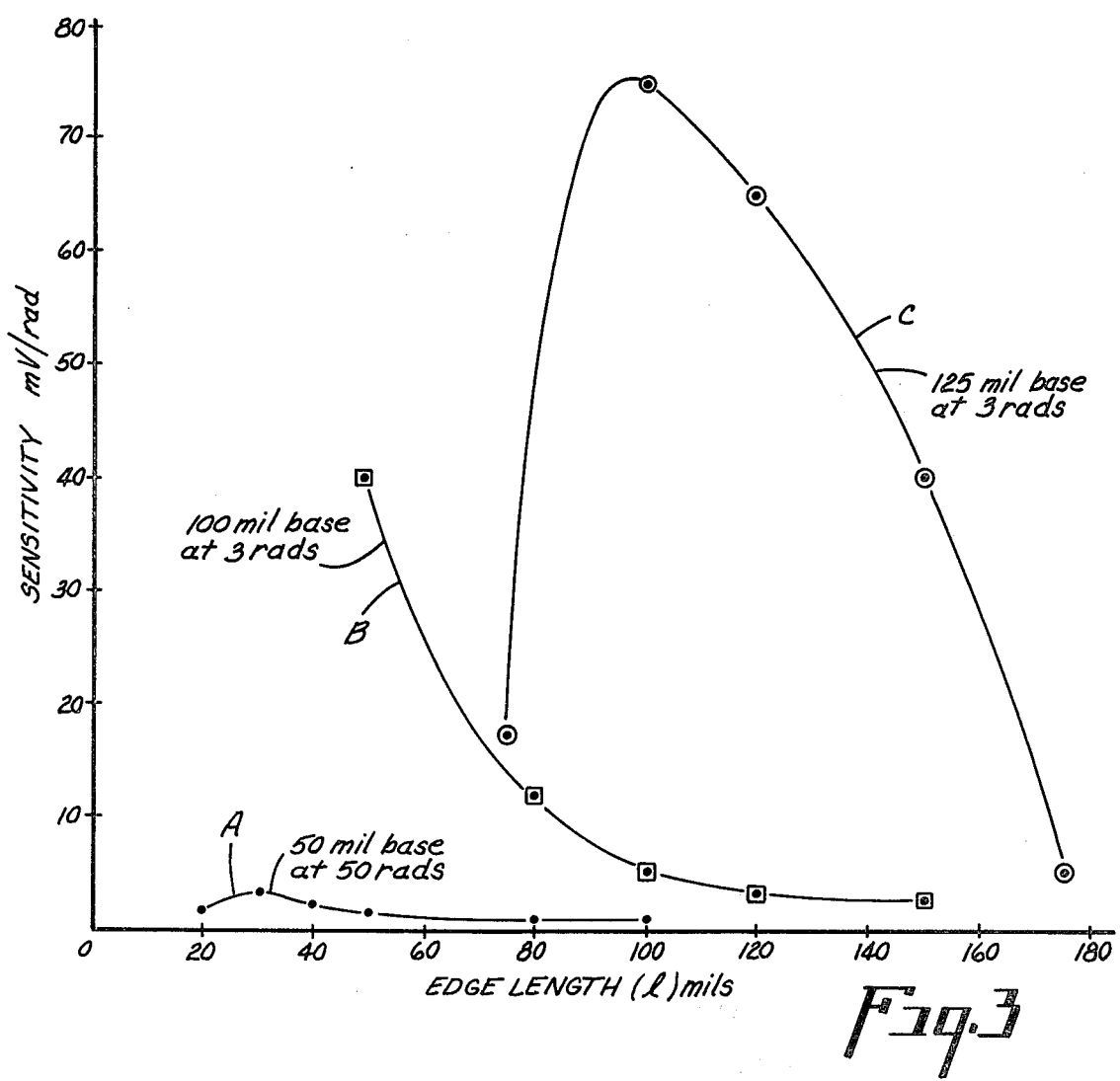

SENSITIVE SILICON PIN DIODE FAST NEUTRON DOSIMETER

BACKGROUND OF THE INVENTION

A conventional silicon PIN diode is produced by diffusing preselected impurities into the broad surfaces of a large wafer of silicon, depositing electrical contacts on the broad surfaces, and dicing the large wafer into smaller discs or chips. The forward voltage drop of such a diode, at a constant current, is used to monitor fast neutron damage in the base region of the diode, which damage is a measure of dosage.

Solid state radiation detectors, also referred to as dosimeter diodes, are used to measure incident radiation, and particularly, incident fast neutrons which are increasingly used for medical and other purposes. In most of these applications, it is desirable to know, simply, quickly and accurately, the dose of fast neutrons to which something or somebody is exposed. Where living organisms are concerned, the accuracy and sensitivity of the detector at accident radiation levels in excess of about a 100 rad dose, are of academic interest. Where people are concerned, it is of increasing importance to know the radiation dose to which they have been exposed, even if the dose is below 10 rads. Prior art devices have been unable to make accurate measurements at low dosages because of poor sensitivity. Lack of sufficient sensitivity in semiconductor dosimeters was of early concern as evidenced by the many studies undertaken to investigate and analyze factors governing diode sensitivity to neutron damage.

Much effort has been directed to produce silicon PIN type conductivity-modulated devices for dosimeter use, the silicon having diffused therein preselected impurities in a predetermined manner, and referred to hereinafter as diffused silicon. Some diffused silicon p-n junction devices are stated to have been produced which could possibly be used as fast-neutron dosimeters in the range of tissue damage from about 10 to 600 rads. (See "Use of Diffused Junctions in Silicon as Fast-Neutron Dosimeters" by Mengali, Paskell, Beck and Peet, Proc. Sec. Conf. Nucl. Radiat. Effects on Semiconductor Devices, Materials and Circuits 1959). In the range from about 0 to 10 rads, we know of the existence of no such device.

More recently, attention has been focused on silicon PIN diodes in which boron-doped, float-zone refined silicon is used as the intrinsic material for the base region. The electrical characteristics of these PIN diodes are highly dependent on the lifetime of excess charge carriers in the i-region of the diode, and hence also extremely sensitive to fast neutron irradiation.

As discussed more fully in "Analysis of the Effect of Fast Neutron Bombardment on the Current-Voltage Characteristic of a Conductivity-Modulated p-i-n Diode" by Swartz and Thurston (J. Appl. Phys. 37 No. 2, 745–755 (1966), the sensitivity of a PIN diode to incident radiation depends directly on (a) the minority carrier lifetime in the base region, and (b) the base width; the sensitivity increases as either (a) or (b) increases. Stated differently, as long as the current density is the same, the sensitivity was deemed not to change for a chosen ratio of base width to carrier lifetime in the base region. Further, there was no suggestion that the mass of the semiconductor was of any relevance. Sensitivity also increases as measuring current increases, but is limited by rise in temperature of the diode. Thus, it will be evident that the present invention is concerned with PIN type diodes having a relatively thick intrinsic zone, greater than about 30 mils.

U.S. Pat. No. 3,982,267 teaches a PIN diode with a moderately thick intrinsic zone about 3 to 10 mils thick, where the lateral surfaces are roughened to give a leakage resistance having a value lower than a few hundred megohms. However, leakage resistance would have to be in the order of only a few ohms, in order to have any noticeable effect on a PIN diode operated in the high level injection region. The sensitivity of a dosimeter is essentially independent of leakage resistance since a silicon diode dosimeter would not be used in a reverse bias for a fast neutron dosimeter. Surface damage, for example, the roughness associated with a 270 grit diamond saw cut, is tolerable, as is a chemically polished or otherwise smooth surface, provided it does not approach a defect-free surface.

Despite the knowledge that, in these silicon PIN diodes, base width (hereinafter referred to by the symbol "d") is desirably larger for better sensitivity, the criticality of the arrangement of the mass of a dosimeter diode escaped workers in the art. It will be recognized that arrangement of the mass of a silicon-diffused semiconductor material is a principal concern in high power silicon rectifiers in which the end area increases to handle increased power. Because high power silicon rectifiers are generally thin, being less than 30 mils thick, their edge surface areas, or edge areas, are small compared to their volume. By edge surface area, or edge area, we refer to the circumferential area of a right cylinder, or the sum of the areas of the four vertical sides of a rectangular block. Though high power silicon rectifiers are unrelated to silicon dosimeter diodes, it should be noted that, in the rectifier, the ratio of edge area to volume is desirably small, while in the dosimeter, this ratio is desirably large to obtain better sensitivity. It will also be noted that silicon rectifiers are generally especially treated to obtain ultra-smooth surface areas, and their deep junctions are designed for both forward voltage and reverse bias. As mentioned hereinabove, surface smoothness in a dosimeter is not critical.

SUMMARY OF THE INVENTION

It has been discovered that a heretofore unattainable sensitivity of a silicon PIN diode dosimeter, enabling detection of an absorbed dose as low as about 0.1 rad, may now be achieved by arranging the mass of semiconductor material of the diode so that the ratio of the surface edge area to volume is always greater than or equal to four times the inverse base width.

As a result of the discovery of the unexpected and surprising effect of the arrangement of the mass of the diode as evidenced by the ratio of edge area to volume of the diode, it is an object of this invention to provide a method of improving the fast neutron sensitivity of a silicon PIN diode dosimeter.

It is another object of the present invention to provide a method to control sensitivity of a silicon PIN diode by arranging the mass of the diode in relation to specific geometric parameters.

It is still another object of the present invention to provide a silicon PIN diode personnel dosimeter which is sensitive to fast neutron radiation impinging upon the dosimeter at a level as low as 0.1 rad absorbed dose, and having a sensitivity of at least 10 mV/rad in the range from about 0.1 rad to about 10 rads.

These and other objects and advantages of the invention will be appreciated and better understood by reference to the following detailed description when considered in connection with the accompanying drawings.

BRIEF DESCRIPTION OF THE DRAWINGS

FIG. 1 is a perspective view diagrammatically illustrating a silicon PIN diode dosimeter in accordance with this invention, wherein the base width of the intrinsic zone is greater than the edge length of a square-ended diode.

FIG. 2 is a perspective view diagrammatically illustrating a silicon PIN diode dosimeter in accordance with this invention, wherein the base width of the intrinsic zone is greater than the diameter of a circular end of a right cylindrical diode.

FIG. 3 is a graph in which the sensitivities of numerous diode dosimeters are plotted against edge length; each dosimeter is a rectangular parallelepiped with a square end.

DETAILED DESCRIPTION OF A PREFERRED EMBODIMENT

Though it will be apparent that a silicon PIN dosimeter diode cannot exist without some mass, there was no suggestion in the art that the chosen mass of a diode would affect its sensitivity. Not surprisingly therefore, there was little concern as to the arrangement, geometrically, of the chosen mass. Conventionally, dosimeter diodes are cut as small rectangular plates from a large circular plate of intrinsic semi-conductor material, the circular end surface areas of which have impurities diffused into them. A diffused silicon disc, either n or p-type, from which dosimeter diodes are to be cut, is prepared by diffusing phosphorous into one end surface to a depth of up to 2 mils, and boron into the other, to about the same depth, in a conventional manner. Good electrical contact with the surface of the diffused silicon material is secured by coating the disc with an electrically conducting metal, such as nickel. The thickness of the intrinsic zone, between the p+ type region at one end, and the n+ type region at the other end is defined as the base width "d" of the diode. The base width of each dosimeter diode is that of the large plate, usually in the range from about 40–50 mils, and conventionally, the rectangular ends of each diode are square having a side or edge length in the range from about 50–100 mils. Typically, the edge length of a conventional diode dosimeter is substantially greater than the base width, a silicon PIN dosimeter being 40 mils of base width and 100 mils square. Thin wire leads are soldered to the metal coating on each side of the dosimeter diode and the assembly is encapsulated in a suitable synthetic resinous material for protection.

Referring now to FIG. 1, there is shown, not to scale and very much enlarged, a silicon PIN type diode dosimeter, indicated generally be reference numeral 10, cut from the diffused silicon disc prepared as described hereinabove. As shown, the dosimeter diode is a rectangular parallelepiped having square ends of edge length l. Between the p+ type and n+ type regions of the diode, there exists a base region or zone of essentially intrinsic material 11 of high purity silicon having a high resistivity in the range from about 50 Ω-cm to about 1000 Ω-cm. High resistivity material is chosen which has an effective minority carrier lifetime in the range from about 250 microseconds to 750 microseconds or longer. The effective lifetime is preferably as long as possible, since it is known that sensitivity increases with longer lifetime. After diffusion of impurities into the silicon, the effective bulk carrier lifetime is preferably greater than about 100 microsecs. The lifetime is measured by open circuit voltage decay techniques which yields a lifetime that depends on the edge and contact surfaces, in addition to the bulk. Thus, "effective bulk carrier lifetime" implies a wafer large enough that the edges do not interfere, but contact surfaces that do. The lifetime of material before diffusion is measured by optical techniques.

The thickness of the base region, indicated in the drawings by reference character "d", may be in the range from about 30 mils to about 200 mils. Even larger base widths may be used, but the stability of a dosimeter having a base width greater than about 125 mils is uncertain, and it is difficult to obtain uniformity of product. Moreover, there is little economic justification for a base width much in excess of about 125 mils if the desired sensitivity can be obtained with a smaller base width dosimeter.

A dosimeter 10 of this invention typically has a base width d in the range from about 30 mils to about 125 mils, and preferably from about 40 mils to about 100 mils. The edge length or side, referred to simply as the edge "l", is critical in relation to the base width d, and is so chosen that l is equal to or less than d, that is $l \leq d$. The area of each side is ld, and the edge area is the sum of the four sides, that is, $A_e = 4ld$. The volume, referred to by the symbol V, is: $V = l^2d$, so the ratio $A_e/V = 4/l$. When $l = d$, then $A_e/V = 4/d$. Since $l \leq d$ then $A_e/V \geq 4/d$. It will be evident that, where the ends of the rectangular parallelepiped are not square, the edge area is computed according to the edge lengths of the end. No particular advantage is obtained in making the edges of the diodes of different lengths, or at different angles, since the shortest dimension is determinative. A wire lead 12 is soldered to the metal coating 13 on one end surface of the dosimeter 10, and another wire lead 14 is soldered to the metal coating 15 on the other end surface of the dosimeter.

Referring now to FIG. 2, there is shown a sensitive, right cylindrical silicon PIN diode dosimeter, not to scale and very much enlarged, indicated generally by reference numeral 20, cut from the diffused-silicon disc prepared as described hereinabove. In a manner analogous to that described for the rectangular dosimeter 10, the cylindrical dosimeter 20 is provided with wire leads 22 and 24 soldered to metal contacts 23 and 25 on opposite ends of the cylinder. A dosimeter 20 of this invention typically has a base width "d" in the range from about 30 mils to about 125 mils, and preferably from about 40 mils to about 100 mils. The diameter of the dosimeter 20 is 2r and the edge area $A_e = \pi(2r)d$. The volume $V = \pi(r^2)d$, so that the ratio $A_e/V = 2/r$ and, if $d = 2r$, then $A_e/V = 4/d$. Since, in this invention it is essential that 2r is less than or equal to d, that is $2r \leq d$, then $A_e/V \geq 4/d$.

It will now be evident that, whether the dosimeter is a rectangular parallelepiped, or right cylindrical disc, it is essential that the mass of diffused-silicon material be arranged so that the ratio of edge area to volume, irrespective of the shape of the surface, is greater than, or equal to, 4 divided by the base width, or four times the inverse base width. This relationship may be written $$A_e/V \geq (4/d)\text{mil}^{-1}$$

were $A_e$ is edge area, V is volume and d is base width.

Though, in general, it will now be seen that the sensitivity of a silicon diode dosimeter increases as the ratio $A_e/V$ increases, or as the ratio d/l increases, the sensitivity of a dosimeter diode is adversely affected when l is smaller than about 20 mils. This occurs at the point at which detrimental edge effects dominate bulk effects. Hence, the dosimeter of this invention has an edge length of at least 20 mils, and preferably at least 30 mils. Where the end of a rectangular parallelepiped diode is not a square, then the shorter side of the rectangular end is at least 20 mils, ad preferably 30 mils.

Since the $p^+$-type region and the $n^+$-type region on either side of the intrinsic zone, are each about a mil deep, and the coated electrically conducting metal deposits on each end of the diode are generally no more than a fraction of a mil thick, it will be evident that the overall thickness or height of dosimeter is essentially the same or greater than the edge length of the dosimeter, or its diameter. A rectangular dosimeter of this invention will preferably have at least two edges of each end greater than 20 mils long, and most preferably more than 30 mils long. Typically a dosimeter is a rectangular parallelepiped with each end more than 30 mils square to avoid detrimental edge effects.

The sensitivity of the dosimeter 10 of this invention is illustrated by reference to FIG. 3 in which the sensitivity (millivolts/rad) is plotted against edge length (mils) for numerous dosimeter diodes made from the same silicon material which was diffused with phosphorous and boron in the same way to the same depth, under identical conditions.

Near the bottom of FIG. 3 there is shown a Curve A for dosimeters of square cross section having a base width of 50 mils, exposed to 50 rads of absorbed dose of fast neutrons. All measurements are made at 100 ma current pulse. Data points at edge lengths of 70 mils and 100 mils represent prior art dosimeters. The sensitivity at each point is less than 1 mV/rad. As edge length decreases, the sensitivity improves. Where d=l=50 mils sensitivity is about 1 mV/ rad, and the sensitivity peaks at about l=30 mils. As edge length is decreased even further it is seen that sensitivity decreases because of detrimental edge effects.

As will be seen from curve A, a prior art dosimeter is unable to measure absorbed dose of less than about 20 rads with adequate resolution. In fact, since prior art dosimeters have essentially no resolution under about 20 rads absorbed dose, the signal-to-noise ratio is too low for reliable measurement in the range below 20 rads. A typical prior art diode having a 50 mil base and 100 mil edge length square, has a sensitivity of less than 1 mV/rad at 50 rads absorbed dose.

Referring now to curve B in FIG. 2, there is shown a plot for a base width of 100 mils exposed to 3 rads absorbed dose. It is seen that the data point for the longest edge length (150 mils) exhibits the least sensitivity of the data points shown. The sensitivity improves more rapidly as soon as the edge length equals the base width, and reaches a value of 40 mV/rad for an edge length of 50 mils. Values for even smaller edge lengths were not determined.

Referring now to Curve C in FIG. 2, there is shown a plot for dosimeters having a base width of 125 mils exposed to 3 rads absorbed dose of fast neutrons. It is evident that the sensitivity of a dosimeter with an edge length of 125 mils is about 62.5 mV/rad which is a value substantially higher than that obtained with a ratio of d/l=1 for smaller base widths. Clearly therefore, in addition to the improved sensitivity obtained because of arranging the mass so that the edge length is less than the base width, there is an advantage in choosing a large base width. As seen from Curve C, sensitivity drops off sharply after edge length becomes greater than the base width.

We claim:

1. A personnel dosimeter comprising a semiconductor mass wherein said semiconductor mass is silicon diffused with an impurity to provide a $p^+$-type junction, a $n^+$-type junction, and a high resistivity zone therebetween, having an effective bulk carrier lifetime greater than about 100 microsecs., and said mass is formed to present a structure in which the ratio of its edge area to volume is equal to, or greater than, four times its inverse base width.

2. The personnel dosimeter of claim 1 wherein said base width is at least 30 mils.

3. The personnel dosimeter of claim 1 wherein its sensitivity, in the range from about 0.1 rad to about 20 rads absorbed dose, is at least 5 mV/rad.

4. The personnel dosimeter of claim 2 wherein said sensitivity, in the range from about 0.1 rad to about 5 rads absorbed dose, is at least 10 mV/rad.

5. The personnel dosimeter of claim 2 wherein said mass is a rectangular parallelepiped having each of two edges of one rectangular end at least 30 mils long and a base width in the range from about 30 mils to about 200 mils.

6. The personnel dosimeter of claim 2 wherein said mass is a right cylinder having a diameter of at least 30 mils and a base width in the range from about 30 mils to about 30 mils.

7. A method of controlling and improving the sensitivity of a diffused silicon semi-conductor mass to fast neutrons having an energy level greater than about 100 KEV, comprising selecting said mass so as to indicate an effective bulk carrier lifetime of at least 100 microseconds, and forming said mass to obtain a silicon PIN diode dosimeter with a structure having a pre-selected ratio of edge area to volume, which ratio is equal to or greater than, four times the inverse base width of said mass and, measuring the forward voltage drop to indicate fast neutron dosage.

8. The method of claim 7 wherein said base width is in the range from about 30 mils to about 200 mils.

* * * * *

UNITED STATES PATENT OFFICE
CERTIFICATE OF CORRECTION

PATENT NO. : 4,163,240

DATED : July 31, 1979

INVENTOR(S) : Philip R. Swinehart; John M. Swartz

It is certified that error appears in the above-identified patent and that said Letters Patent are hereby corrected as shown below:

In the claims, claim 6, column 6, line 44 should read "about 200 mils."

Signed and Sealed this

Thirtieth Day of October 1979

[SEAL]

Attest:

RUTH C. MASON
Attesting Officer

LUTRELLE F. PARKER
Acting Commissioner of Patents and Trademarks